United States Patent [19]
Moritz et al.

[11] Patent Number: 5,773,941
[45] Date of Patent: Jun. 30, 1998

[54] TWO-WIRE BRUSHLESS DC MOTOR CONTROL SYSTEM

[75] Inventors: Frederick G. Moritz, Hauppauge; Roger Mosciatti, Coram, both of N.Y.

[73] Assignee: MFM Technology, Inc., Ronkonkoma, N.Y.

[21] Appl. No.: 742,821

[22] Filed: Oct. 31, 1996

[51] Int. Cl.[6] ............................. H02P 6/02; H02K 29/08
[52] U.S. Cl. ........................ 318/254; 318/138; 318/439
[58] Field of Search ................................. 318/138, 139, 318/245, 254, 439, 599, 685, 360–379; 388/812, 800, 816

[56] References Cited

U.S. PATENT DOCUMENTS

| | | | |
|---|---|---|---|
| 3,577,059 | 5/1971 | Kelley, Jr. ................................. | 321/10 |
| 3,584,279 | 6/1971 | Krauthamer ............................. | 318/227 |
| 3,772,588 | 11/1973 | Kelly et al. ............................... | 323/17 |
| 4,510,422 | 4/1985 | Ogura ....................................... | 318/254 |
| 4,583,028 | 4/1986 | Angersbach et al. ................... | 318/254 |
| 4,763,049 | 8/1988 | Magee ..................................... | 318/254 |
| 4,827,196 | 5/1989 | Odell ....................................... | 318/254 |
| 5,063,338 | 11/1991 | Capel et al. ............................. | 318/685 |
| 5,136,220 | 8/1992 | Philipp ..................................... | 318/362 |
| 5,189,349 | 2/1993 | Haga ....................................... | 318/254 |
| 5,317,245 | 5/1994 | Moritz et al. ........................... | 318/254 |

*Primary Examiner*—Paul Ip
*Attorney, Agent, or Firm*—Lane,Aitken,McCann

[57] ABSTRACT

A two wire, brushless, d.c. motor power control system employs a rechargeable d.c. power source (e.g. a battery or a capacitor) to provide power to the commutation position sensing electronics, and commutation logic during dynamic braking and also if desired, during motor start-up after stopping or reversing direction. Current limiting is provided by sensing the two-wire motor current and using the communicating logic to modulate the turn-off/turn-on time of the communicating switches.

6 Claims, 3 Drawing Sheets

TWO-WIRE BRUSHLESS DC MOTOR CONTROL SYSTEM

BACKGROUND OF THE INVENTION

1. Field Of The Invention

This invention relates to improvements in two-wire, brushless, d.c. motor control systems, and more particularly, to a two-wire control system with local rechargeable power for, inter alia, dynamic breaking.

2. Description Of The Prior Art

U.S. Pat. No. 5,317,245, assigned to the assignee of this application, and incorporated herein by reference, discloses and claims a power control system for brushless, d.c. motors (rotary and linear) in which the rotor/slider commutating position sensing electronics, commutating control logic, and commutating switches are physically located on the motor or in close proximity thereto. Two wires, which power the motor via the commutating switches, also provide power to the commutating position sensing and commutating control logic, even when the motor is starting from a stopped position or is changing direction.

While an important advance over the prior art, U.S. Pat. No. 5,317,245 does not address certain issues, which arise in two-wire, brushless, d.c. motor control applications.

In order to provide dynamic braking in a two wire, brushless, d.c. motor system, a conducting path must be provided during braking to allow a braking current to flow through the motor coils while the slider or rotor is moving generating the braking current. Conveniently, this conducting path is provided by a short circuit across the two power wires at the output of the power control amplifier. In this dynamic braking mode, it is not practical to use an output from the power amplifier to power the switch commutation logic or the rotor/slider position module.

Current limiting is needed in order to protect the power drive components of the two wire system when powered from sources which do not provide current limiting (e.g. batteries, unregulated power supplies), and during dynamic breaking.

In a conventional brushless, d.c. linear motor in position servo applications, since the coils move, the three power wires and the eight sensor wires must be festooned in a cable with sufficient slack to accommodate the full travel of the linear motor slide.

SUMMARY OF THE INVENTION

An object of this invention is the provision of a two-wire, brushless, d.c. motor control system with a rechargeable power supply.

Another object of this invention is the provision of a system of two-wire, brushless, d.c. linear motor control for position servo applications.

Briefly, this invention contemplates the provision of a two wire, brushless, d.c. motor power control system which employs a rechargeable d.c. power source (e.g. a battery or a capacitor) to provide power to the commutation position sensing electronics, and commutation logic during dynamic braking and also if desired, during motor start-up after stopping or reversing direction. Current limiting is provided by sensing the two-wire motor current and using the communicating logic to modulate the turn-off/turn-on time of the communicating switches.

A module housing the slider commutation position sensor electronics, the commutation switching logic, and communicating switches is mounted on the slider in a two-wire, brushless, linear motor application. A slider position transducer is mounted along the slide path with power coupled to the slide position transducer from the module. In a preferred embodiment of the invention, the slider position signal is coupled wirelessly from the slider position transducer to a stationary receiver, thus reducing from thirteen to two the number of wires needed for linear motor applications.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
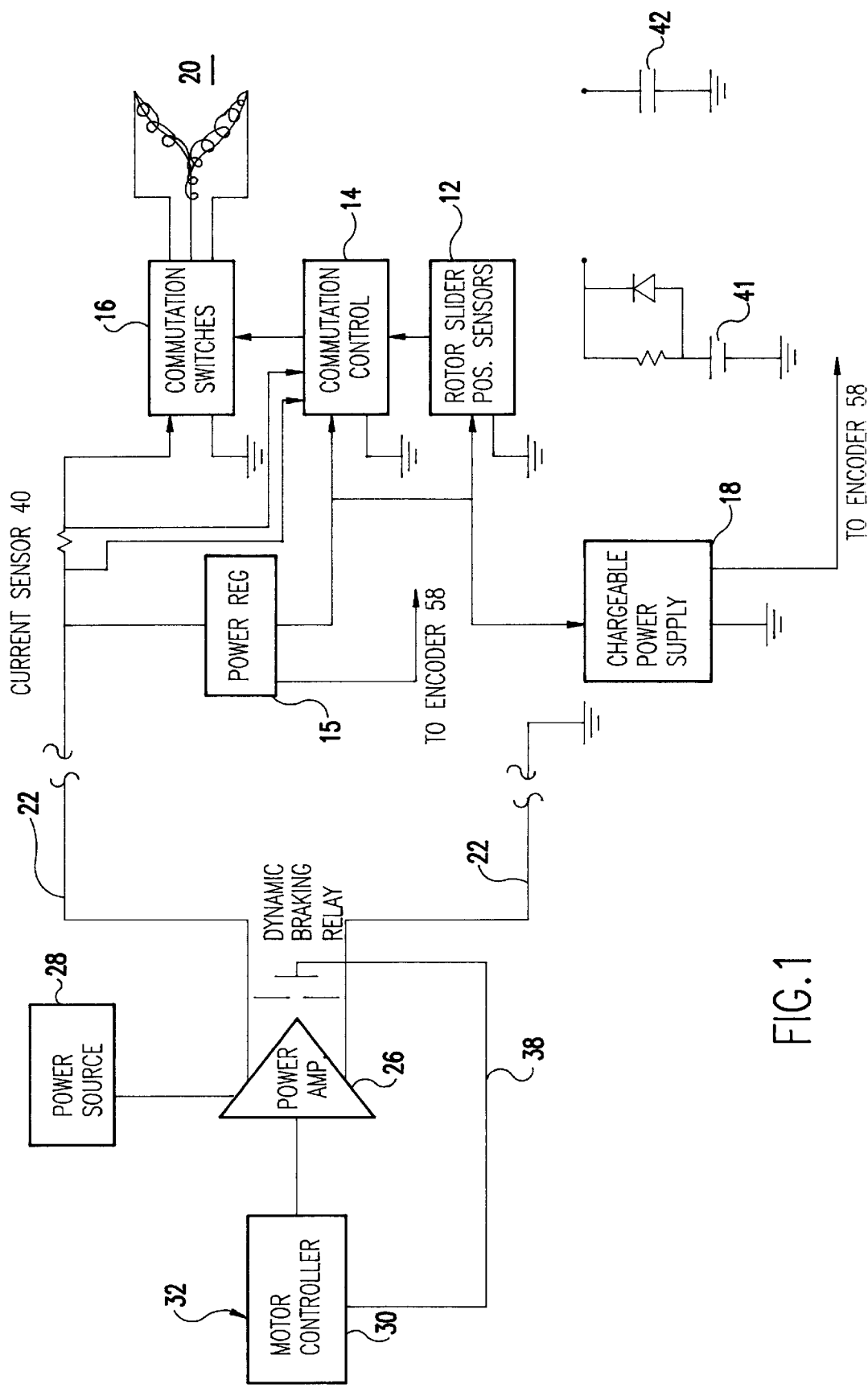
FIG. 1 is a block diagram of a specific embodiment of a two-wire, brushless, d. c. motor control system in accordance with the teachings of this invention.

It will be appreciated that the system shown in FIG. 1 is an extension of the basic two-wire control system concepts disclosed in U.S. Pat. No. 5,317,245 referred to previously, and to which reference may be made for a detailed description. Power for a commutation position sensor electronics module 12 and the commutation control logic module 14 is supplied via a power regulator 15 from the same two wires 22 that supply power to the motor windings 20 via commutation switches 16. In some embodiments of that invention, a high frequency oscillator is coupled to the two wires that supply power to the motor. This high frequency signal is used to provide continuous power to the commutation position sensor electronics and the commutation control logic even when there is no power (or insufficient power) on the two wires (e.g. as the motor starts from a stopped condition). In other embodiments of that invention, in which pulse width modulation is used to control the motor current, a separate oscillator signal is not always necessary for powering the commutation sensors and the commutation logic.

In the embodiment of this invention shown in FIG. 1, power for the commutation position sensor electronics 12 and the commutation control logic 14 is provided by a rechargeable power supply 18 during periods when there is no power or insufficient power available from the two wires 22. Here it will be appreciated that the commutation position sensor electronics 12 and the commutation control logic 14, the power regulator, the commutation switch 16, and the rechargeable power supply 18 are all located on or in close proximity to the coils 20 of the brushless motor, which may be either a rotary brushless motor or a linear brushless motor.

The two power wires 22 couple the motor coils 20 to a remotely located power control amplifier 26. Power control amplifier 26 can be designed to implement any of a number of suitable prior art power control strategies; for example, linear control of the amplifier output voltage, or pulse width modulation of the output voltage. The amplifier 26 has a power input from a d.c power supply 28 and a control input from motor controller 30. The motor controller may have a rotor/slider position transducer input 32 in a closed loop position servo system.

A switch 36 is connected across the two power lines 22 in order to provide a low impedance current path for the motor coils during a dynamic braking operation. The switch 36 may be implemented as a conventional relay switch or a solid state switch. Signal line 38 couples a suitable control signal from motor controller 30 to the switch 36 to open the switch during normal operation, and close the switch during a dynamic braking operation. Here it should be noted that since a signal line 38 couples the switch 36 to the controller 30, the switch should be physically located in proximity to the amplifier 26 and motor controller 30.

A current sensor, for example a current sensing resistor 40, senses the current in the two-wire power lines to the motor. The output of the sensor (i.e. the voltage across the resistor 40) is coupled as an input to the communication switching control logic 14. When the current exceeds a threshold value, the switching logic limits the "on" time of the respective communicating switches in order to limit the current through motor coils. This is particularly important during dynamic braking. In other operational modes, current limiting may be provided by the amplifier 26, if it is of a type that provides this function. If the amplifier 26 does not provide this current limiting function, the sensor 40, in combination with the communication control logic 14, can provide current limiting for all operational modes.

In operation, when there is sufficient voltage across the two wires 22 to provide power to the power regulator 15, power is drawn by the regulator 15 from the two wires 22 and the output of the regulator powers the commutation control logic 14, the rotor/slider commutation position sensor electronics, and maintains a charge on the power supply 18. As will be appreciated by those skilled in the art, depending upon the motor control scheme implemented by the amplifier 26, there may not be sufficient voltage to provide power to power regulator 15 during initial starting of the motor. During dynamic braking, with switch 36 closed, there will not be sufficient voltage to provide power to power regulator 15. However, it will be appreciated that the commutation logic must activate the commutation switches in a proper sequence during starting and during dynamic braking. During periods of insufficient voltage across the two wires 22 to provide power to the power regulator 15, the power supply 18 provides the required input power to the commutation control logic 14 and the commutation position sensor electronics 12. In the specific embodiment of the invention shown here, the power supply 18 is coupled directly to the commutation control logic 14 and the commutation position sensor electronics 12. However, a power regulator, such as, for example, a boost regulator could be used to step-up the d.c. voltage if needed, or desired. Preferably, the power supply 18 is rechargeable. For example, as illustrated in the drawing, the power supply 18 may comprise a rechargeable battery 41 or a capacitor 42. The implementation with a rechargeable battery is preferred for most applications, as the capacitor would have to be recharged after each event calling for its use and may not be suitable where, for example, the motor is dynamically braked and then restarted with a voltage ramming up from a low voltage.

Figure 2:
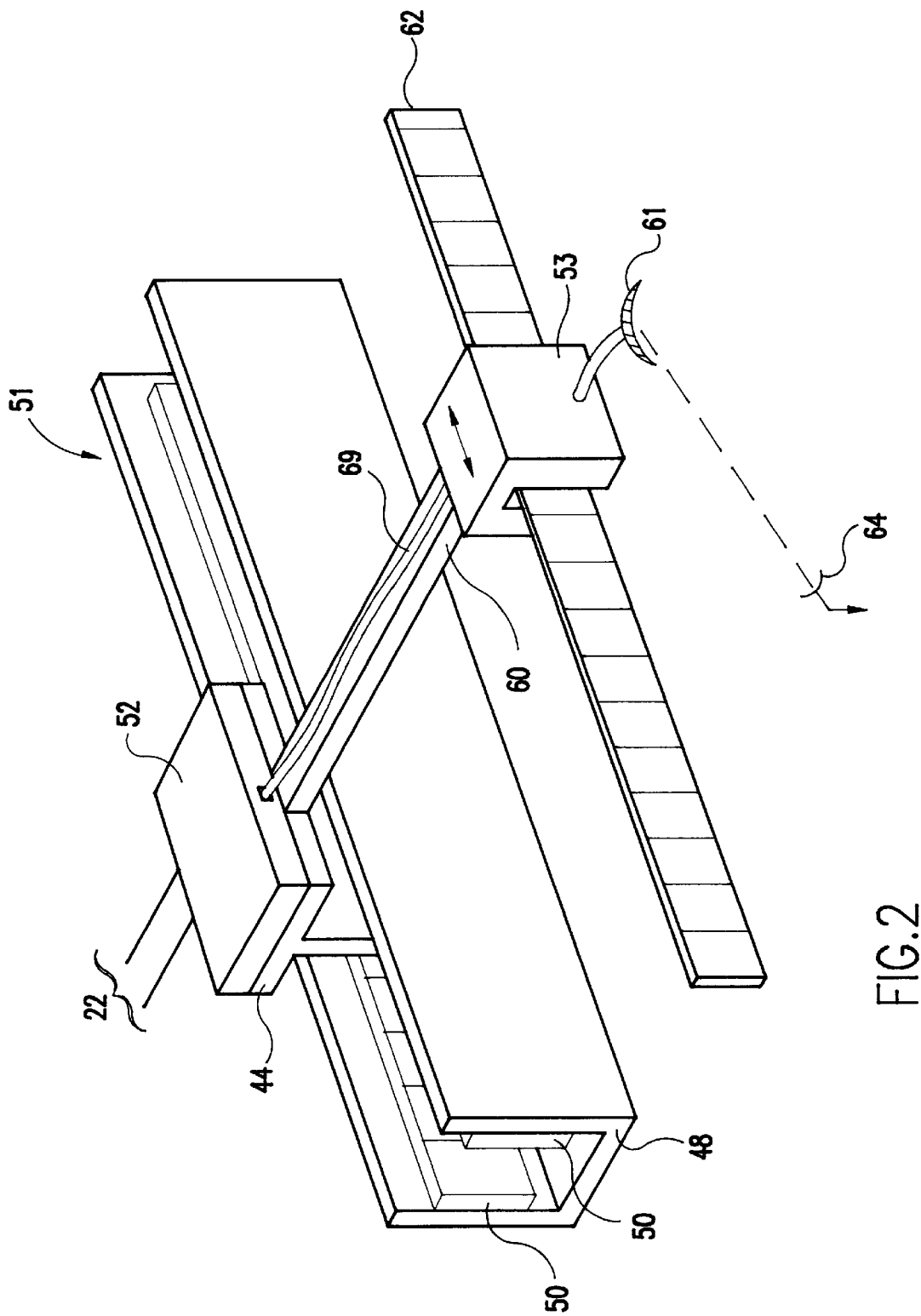
FIG. 2 is a perspective view of a brushless, d.c., linear motor with a two-wire control system in accordance with the teachings of this invention.
Figure 3:
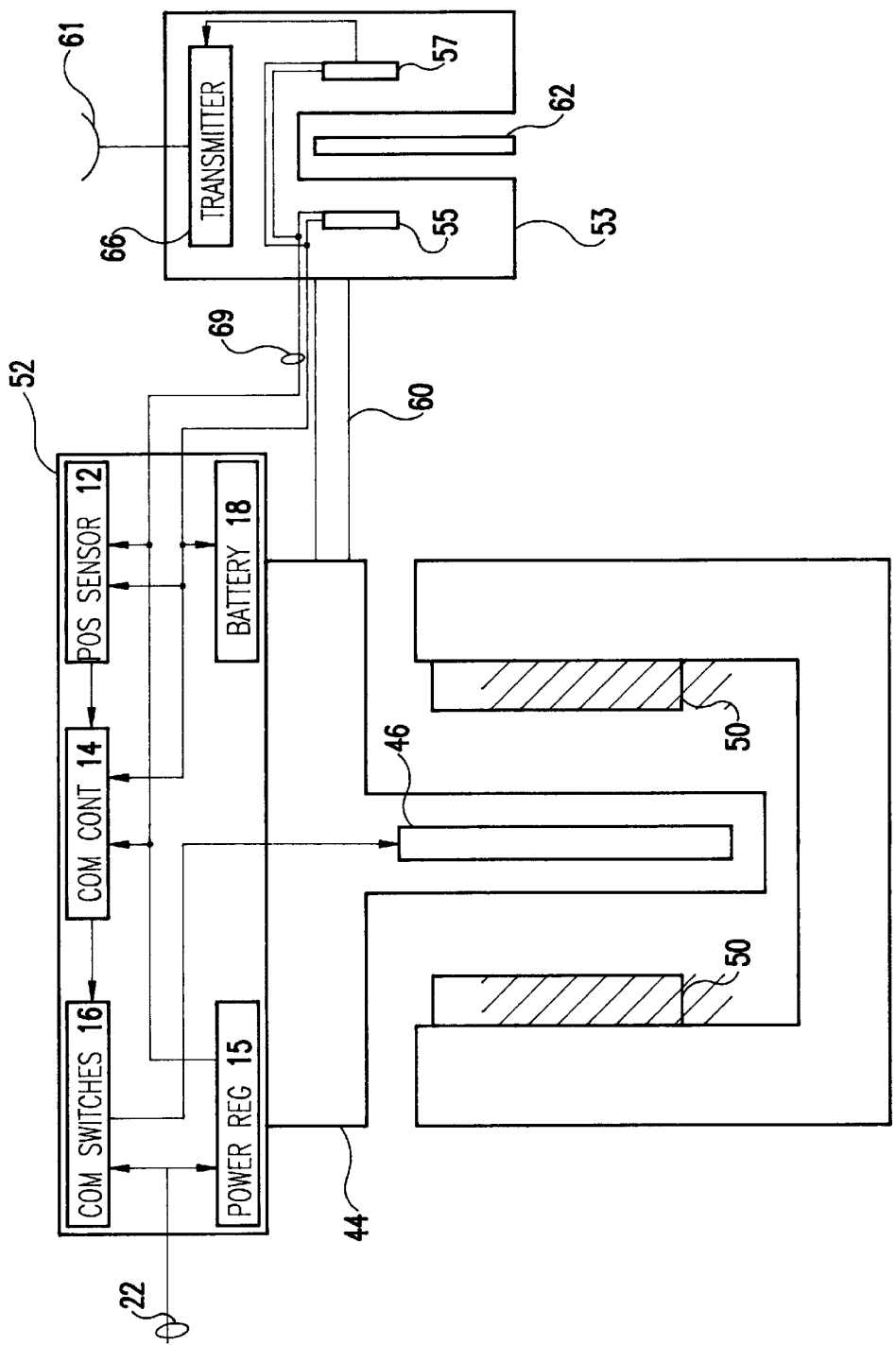
FIG. 3 is a sectional view of the motor shown in FIG. 2 with certain components represented in block form.

Referring now to FIGS. 2 and 3, they illustrate, as will be appreciated by those skilled in the art, a typical linear motor, indicated by the general reference number 51, in combination with a slider position encoder module 53. The linear motor 51 includes a slider 44, motor coils 46 and commutation position sensors (e.g. Hall effect sensors not shown) carried by the slider 44, and a stator 48 which has a series of permanent magnets 50. In accordance with the teachings of this invention, the commutation switches 16, the commutating switch logic 14, the slider commutation position sensor electronics 12, and the auxiliary circuitry such as power regulator 15 and power supply 18 are all mounted in a module 52 which is attached to the top surface of a slider 44. The two power wires 22 provide power to the motor coils 46 via the commutating switches 16, and also to the commutation switching logic 14, and the commutation position sensor electronics 12, as explained in connection with FIG. 1. Here it should be noted, the two-wire, brushless motor system with a local power supply disclosed above in connection with FIG. 1 or the system disclosed in the aforementioned U.S. Pat. No. 5,317,245 may be used in a specific implementation.

The position encoder module 53 is attached to one end of an arm 60 the other end of which is attached to the slider 44. The encoder module 53 rides along a linear scale 62. The arm 60 is attached the slider 48 either directly, as shown, or indirectly by attachment to the module 52. The position encoder module 53 may, for example, comprise a light source 55 in combination with a light sensor 57, and the linear scale may comprise an optical grating which alternately blocks and unblocks the optical path between the light source and the light sensor as the slider moves. The position encoding signals from the encoder 53 are preferably transmitted by a suitable prior art wireless transmission link between a radiating element 61 on the encoder 53 and a stationary receiver 64. The wireless transmission link may be a radio frequency (rf) link for example, in which case the encoder 53 carries an rf transmitter 66 and the radiating element 61 is an antenna. Alternatively, the wireless link may comprise an optical link with an infrared transmitter and an infrared receiver. If desired, positional data from the position encoder 53 may be coupled over a hardwired transmission link (not shown) such as a high frequency coaxial link. Irrespective of the encoder data transmission link used, a power line 69 couples power from the module 52 to the encoder module 53 in order to provide power to the encoder and the data signal transmitter. Conveniently, the power to the encoder and data signal transmitter is coupled from power regulator 15 and the power supply 18, as indicated in FIG. 1. Alternatively, a back-up power source (e.g. a battery) may be located in the encoder housing, in systems in which there is no power available at certain times (e.g. U.S. Pat. No. 5,317,245).

While the invention has been described in terms of a preferred embodiment, those skilled in the art will recognize that the invention can be practiced with modification within the spirit and scope of the appended claims.

Having thus described my invention, what I claim as new and desire to secure by letters patent is as follows:

1. A two-wire control system to be mounted on or in proximity of a brushless, d.c. motor, comprising in combination:

commutating switch means;

commutating control logic means coupled to said commutating switch means for controlling the sequence of opening and closing of individual switches that comprise said commutating switch means;

rotor/slider commutating position sensing means coupled to said commutating control logic means for inputting rotor/slider commutation position data to said commutating control logic means;

rechargeable power supply means, and means for coupling said rechargeable power supply means to said commutating control logic means, and said rotor/slider commutating position sensing means;

two-wire power input means for coupling power to said two-wire control system from a power amplifier; and means for coupling said two wire power input means to said rechargeable power supply means, said commutating switch means, said commutating control logic means, and said rotor/slider commutating position sensing means.

2. A two-wire control system to be mounted on or in proximity of a brushless, d.c. motor, comprising in combination:

commutating switch means;

commutating control logic means coupled to said commutating switch means for controlling the sequence of opening and closing of individual switches that comprise said commutating switch means;

rotor/slider commutating position sensing means coupled to said commutating control logic means for inputting rotor/slider commutation position data to said commutating control logic means;

rechargeable power supply means, and means for coupling said rechargeable power supply means to said commutating control logic means, and said rotor/slider commutating position sensing means;

two-wire power input means for coupling power to said two-wire control system from a power amplifier; and means for coupling said two wire power input means to said rechargeable power supply means, said commutating switch means, said commutating control logic means, and said rotor/slider commutating position sensing means;

current sensing means coupled to said two-wire power input means, and means to couple said current sensing means to said commutating control logic means in order to modulate the opening and closing of said commutating switch means when current sensed by said current sensing means exceeds a predetermined threshold.

3. A two-wire control system for a brushless, d.c. motor, comprising in combination:

mounted on or located in close proximity to said motor; commutating switch means;

commutating control logic means coupled to said commutating switch means for controlling the sequence of opening and closing of individual switches that comprise said commutating switch means;

rotor/slider commutating position sensing means coupled to said commutating control logic means for inputting rotor/slider commutation position data to said commutating control logic means;

rechargeable power supply means, and means for coupling said rechargeable power supply means to said commutating control logic means, and said rotor/slider commutating position sensing means;

two-wire power input means for coupling a power input to said two-wire control system from a power amplifier; and means for coupling said two wire power input means to said rechargeable power supply means, said commutating switch means, said commutating control logic means, and said rotor/slider commutating position sensing means;

located remotely from said d.c. motor;

said power amplifier, said power amplifier having output terminal means for coupling a power input to said two-wire power input means;

a power controller coupled to an input of said amplifier;

a dynamic braking switch coupled across said output terminal means; and means for coupling from said power controller a signal to open and close said dynamic braking switch.

4. A two-wire control system for a brushless, d.c. motor, comprising in combination:

mounted on or located in close proximity to said motor; commutating switch means;

commutating control logic means coupled to said commutating switch means for controlling the sequence of opening and closing of individual switches that comprise said commutating switch means;

rotor/slider commutating position sensing means coupled to said commutating control logic means for inputting rotor/slider commutation position data to said commutating control logic means;

rechargeable power supply means, and means for coupling said rechargeable power supply means to said commutating control logic means, and said rotor/slider commutating position sensing means;

two-wire power input means for coupling a power input to said two-wire control system from a power amplifier; and means for coupling said two wire power input means to said rechargeable power supply means, said commutating switch means, said commutating control logic means, and said rotor/slider commutating position sensing means;

current sensing means coupled to said two-wire power input means, and means to couple said current sensing means to said commutating control logic means in order to modulate the opening and closing of said commutating switch means when current sensed by said current sensing means exceeds a predetermined threshold;

located remotely from said d.c. motor;

said power amplifier, said power amplifier having output terminal means for coupling a power input to said two-wire power input means;

a power controller coupled to an input of said amplifier;

a dynamic braking switch coupled across said output terminal means; and means for coupling from said power controller a signal to open and close said dynamic braking switch.

5. A two-wire control system to be mounted on the slider of a brushless, d.c. motor, comprising in combination:

commutating switch means;

commutating control logic means coupled to said commutating switch means for controlling the sequence of opening and closing of individual switches that comprise said commutating switch means;

rotor/slider commutating position sensing means coupled to said commutating control logic means for inputting rotor/slider commutation position data to said commutating control logic means;

rechargeable power supply means, and means for coupling said rechargeable power supply means to said commutating control logic means, and said rotor/slider commutating position sensing means;

two-wire power input means for coupling power to said two-wire control system from a power amplifier; and means for coupling said two wire power input means to said rechargeable power supply means, said commutating switch means, said commutating control logic means, and said rotor/slider commutating position sensing means;

a slider position encoder carried by an arm extending from said slider; and means for coupling said two wire power input means and said rechargeable power input means to said encoder.

6. A two-wire control system to be mounted on the slider of a brushless, d.c. motor, comprising in combination:

commutating switch means;

commutating control logic means coupled to said commutating switch means for controlling the sequence of opening and closing of individual switches that comprise said commutating switch means;

rotor/slider commutating position sensing means coupled to said commutating control logic means for inputting rotor/slider commutation position data to said commutating control logic means;

rechargeable power supply means, and means for coupling said rechargeable power supply means to said commutating control logic means, and said rotor/slider commutating position sensing means;

two-wire power input means for coupling power to said two-wire control system from a power amplifier; and means for coupling said two wire power input means to said rechargeable power supply means, said commutating switch means, said commutating control logic means, and said rotor/slider commutating position sensing means;

a slider position encoder carried by an arm extending from said slider;

means for coupling said to wire power input means and said rechargeable power input means to said encode; and wireless means including transmitter means carried by said position slider encoder and receiver means located remotely from said transmitter means.

* * * * *